Dec. 10, 1935.  K. V. NESSELMANN  2,023,969
ABSORPTION REFRIGERATION
Filed June 8, 1934

Inventor:
Kurt V. Nesselmann.
By Harry S. Demarest, Atty.

Patented Dec. 10, 1935

2,023,969

UNITED STATES PATENT OFFICE 2,023,969

ABSORPTION REFRIGERATION

Kurt V. Nesselmann, Berlin-Siemensstadt, Germany, assignor to The Hoover Company, North Canton, Ohio, a corporation of Ohio Application June 8, 1934, Serial No. 729,560

9 Claims. (Cl. 62—119.5)

This invention relates to continuous absorption refrigerating apparatus and more particularly to that type in which a resorber is employed.

In the copending applications of Edmund Altenkirch Serial Numbers 99,890 filed April 5, 1926, and 101,745 filed April 13, 1926, and in the patent to Edmund Altenkirch Number 1,767,639 granted June 24, 1930, and in various other applications and patents an absorption refrigerating system employing a resorber is disclosed. In such systems the resorber takes the place of the condenser in an ordinary continuous absorption refrigerating system, and an additional fluid cycle is added, resorption solution circulating between the resorber and the evaporator.

In accordance with the present invention it is proposed to cause the resorption solution to pass in heat exchange relation with the absorber of the system and transfer heat from the absorber to some other part where it may be discharged to the air or other cooling medium more conveniently than it can be discharged from the absorber.

It is also proposed in accordance with the present invention to cause gas to be expelled from the resorption solution, conveyed to a small jet and discharged therefrom in such a way as to cause inert gas to circulate between the evaporator and the absorber of the system. The arrangement of the jet and the inert gas circuit may be the same as that disclosed in the Altenkirch Reissue Patent #18,924 granted August 22, 1933.

Accordingly, it is an object of the invention to provide a continuous absorption refrigerating system in which a resorber is employed, and in which new functions are added to the resorber circuit.

It is a further object of the invention to provide novel and improved means for cooling the absorber of a continuous absorption system in which a resorber is employed.

It is still another object to provide improved means for circulating inert gas between the evaporator and the absorber of a continuous absorption system.

Various other objects and advantages reside in certain novel features of the arrangement and construction of parts as will be apparent from the following description taken in connection with the accompanying drawing in which.

Figures 1, 2:
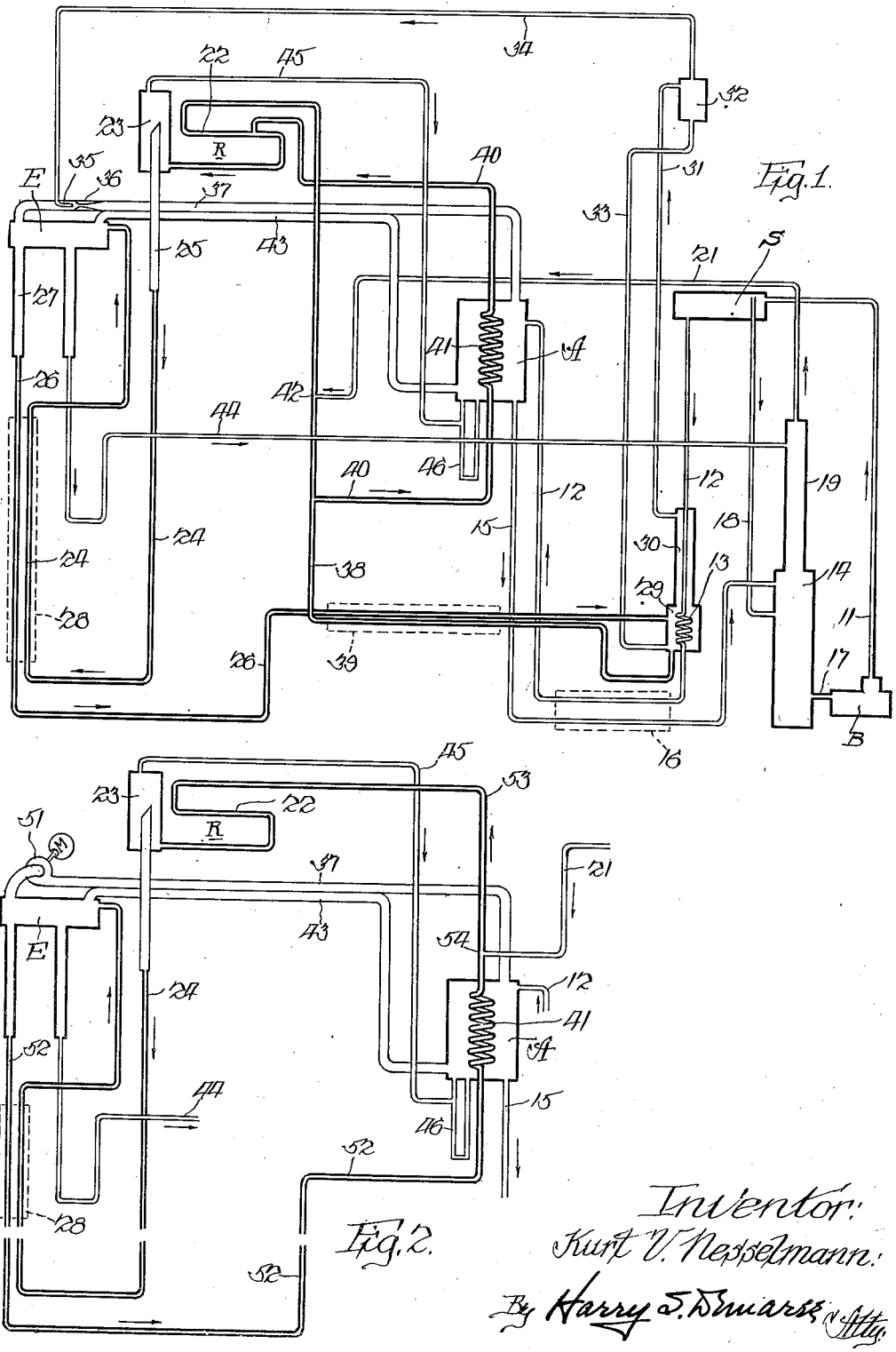
Fig. 1 is a diagrammatic illustration of a complete absorption refrigerating system showing one form of the invention.
Fig. 2 is a fragmentary diagrammatic showing of a portion of a continuous absorption refrigerating system somewhat similar to that shown in Fig. 1, but in which a modified form of the invention is incorporated.

Referring first to the arrangement of Figure 1 it will be seen that the arrangement there shown includes a boiler designated B, a gas separation chamber S, an absorber A, a resorber designated generally by the letter R, an evaporator E and various conduits and auxiliary devices forming a complete refrigerating system. In accordance with known practice the various parts may be constructed of seamless steel tubing and plate welded together so that the entire system is hermetically sealed from the atmosphere. Since the drawing is only diagrammatic it will be understood that the vessels mentioned may be constructed in accordance with known practice, and that the evaporator and the absorber, for example, may be provided with baffle plates or other means for providing an extended surface therein.

The top of the boiler B of Fig. 1 is provided with a dome which is connected to a conduit 11 which acts as a gas lift pump for conveying refrigerant gas and absorption solution from the boiler B into the gas separation chamber S. The lower end of the gas separation chamber S is connected to the absorber by means of a U-pipe 12 which has a portion of its length formed into a coil as indicated in 13, for purposes explained hereinafter. The lower portion of the absorber is connected to an analyzer vessel 14 by means of a second U-shaped conduit 15. The lower portion of the U-conduits 12 and 15 may be in heat exchange relation as indicated by the dotted rectangle 16 at the lower portion thereof. A small horizontal conduit 17 connects the analyzer chamber 14 to the boiler B.

The upper end of the gas separation chamber S is also connected to the analyzer chamber 14 by means of the downwardly extending conduit 18, this conduit being connected to the analyzer at a point below that of the point of connection of the conduit 16 thereof. Gas passing downwardly from the gas separation chamber S to the analyzer 14 through the conduit 18 may thus be caused to bubble upwardly through the liquid in the vessel 14, and pass into a rectifier 19 positioned above and connected to the analyzer. The rectifier 19 may be provided with a number of baffles or external cooling fins in accordance with known practice.

The conduit 21 connects the upper end of the rectifier to the resorber circuit, joining the resorber circuit at the point marked 42. In the drawing the resorber circuit is indicated by slightly heavier lines than those indicating the other conduits of the system. It includes the resorber R which may consist of a coil or reversely bent pipe, as indicated at 22, and a small vertically extending cylinder or vessel 23 to which the coil 22 is connected at the bottom. The vessel 23 is connected to a U-pipe 24 which passes downwardly to the lower portion of the unit and then upwardly to the top of the evaporator. The leg of the U-conduit which connects to the vessel 23 has its upper portion enlarged as indicated at 25 and its upper end beveled to facilitate a flow of liquid therethrough without any gas being entrained therein. The lower portion of the evaporator E is connected to a conduit 26 which likewise has its upper portion enlarged as indicated at 27 and which passes downwardly in heat exchange relation with the portion of the conduit 24 as indicated by the dotted line 28, and then flows across the unit and is connected to a small auxiliary boiler 29. This boiler has a dome 30 at its upper end connected by means of a conduit 31 to a small auxiliary gas separation chamber 32. The gas separation chamber 32 has its lower end connected to a liquid conduit 33 which conveys liquid back to the auxiliary boiler 29, and its upper end connected to a conduit 34 which passes across the unit and is connected to a jet 35 associated with a Venturi arrangement 36 in the gas conduit 37 which conveys inert gas from the evaporator E to the absorber A.

The lower portion of the small auxiliary boiler 29 is connected to the top of the coil 22 of the resorber by conduit 38, the lower horizontal portion of which passes in heat exchange relation with the portion of the conduit 26 as indicated by the dotted line 39. At some points below the absorber A a branch pipe 40 is connected to the conduit 38 and passes upwardly through the absorber A this portion being formed into a coil or other means for providing an extended surface in heat exchange relation with the fluids in the absorber as indicated at 41. The branch pipe 40 continues upwardly above the absorber and is joined to the central portion of the resorber coil 22. Thus in the arrangement of Fig. 1 the conduit 40 provides a parallel path for the flow of resorption solution from the lower portion of the conduit 38 to the coil 22, the branch 40 being in parallel with the branch to which the pipe 21 is connected to the resorber circuit.

As mentioned above, inert gas is employed in the system of Fig. 1. The inert gas is circulated between the evaporator and absorber, the conduit 37 mentioned above conveying it and the refrigerant gas from the evaporator to the absorber and a second conduit 43 connected to the lower portion of the absorber serves to return the inert gas to the evaporator.

In all resorber units means must be provided for draining any excess of liquid which may have found its way into the evaporator or the resorber circuit back to the main boiler and the absorber and for this purpose a conduit 44 has been provided, this conduit is connected to the lower portion of the evaporator and to the top of the rectifier 19.

Means has also been provided for returning any inert gas which may have found its way into the resorber back into the inert gas circuit. A vent pipe 45 is provided for this purpose and connects the resorber vessel 23 to a small U-pipe 46 located below and joined to the absorber.

The apparatus of Fig. 1 may be operated as follows:

Assuming that the unit is charged with ammonia as refrigerant, water as absorbent and hydrogen as in inert gas four independent cycles of circulation will be set up. As heat is applied to the boiler B the ammonia will be expelled from the solution therein and passed upwardly through the gas lift pump conduit 11 and into the separator S. From the separator the ammonia will pass downwardly through the conduit 18, upwardly through the analyzer 14, rectifier 19 and into the resorber circuit through the conduit 21. As the ammonia enters the pipe 38 of the resorber circuit at the point 42 it will cause the resorption solution therein to flow upwardly and into the resorber coil 22. In the resorber coil 22 the ammonia will be absorbed in the resorption solution and flow into the evaporator E through the conduit 24. The ammonia will evaporate out of the resorption solution in the evaporator and flow through the conduit 37 into the absorber 20 where it will be absorbed by the absorption solution and returned to the boiler through the conduit 15, the analyzer 14 and the conduit 17.

At the same time the absorption solution will circulate between the boiler and the absorber the cycle being upwardly through the gas lift pump conduit 11, the gas separation chamber S, the conduit 12, downwardly through the absorber A and back to the boiler through the conduit 15, the analyzer 14 and the conduit 17.

As the warm absorption liquid flows downwardly through the right-hand leg of the conduit 12 some heat will be discharged from the coil 13 and supplied to the resorption liquid in the auxiliary boiler 29. Ammonia gas will thus be expelled in the small auxiliary boiler 29, this ammonia passing upwardly through the conduit 31 and into the small separator vessel 32 from which it will pass the jet 35 through the conduit 34. The ammonia gas expelled in the jet 35 will cause circulation of the inert gas between the evaporator and the absorber, the inert gas flowing from the evaporator through the conduit 37 downwardly through the absorber and back to the evaporator through the gas conduit 43.

As mentioned above, the passage of ammonia gas into the pipe 38 at the point 42 will cause the resorption solution to circulate, its path being upwardly through the conduit 38 downwardly through the coil 22 of the resorber, through the resorber vessel 23 and into the evaporator E through the conduit 24. From the evaporator the resorption liquid will flow downwardly through the pipe 26 into the small auxiliary boiler 29 and from there upwardly through the pipe 38. It will be seen that the branch pipe 40 and the coil 41 provide means for transferring heat from the absorber to the resorber. As heat is taken up in the coil 41 from the fluid in the absorber some ammonia will be expelled from the resorption solution in the coil 41, so that this coil and the upper portion of the pipe 40 may act as a gas lift pump to promote circulation through the branch 40. The absorption in absorber A generates the heat for expelling ammonia from the resorption solution in coil 41. The absorber must operate at a temperature at least as high as that of the weakest solution in the resorber in order to accomplish this. In order to properly regulate the amount of resorption solution flowing through the branch 40 and through the branch which meets the ammonia conduit 21, suitable valves may be necessary, but these are not shown in the drawing for the sake of simplicity. Once the proper ratio between the two branches is determined, restrictions in these pipes or variations in sizes might be used in place of valves.

It has previously been proposed to provide means for transferring heat of absorption from the absorber to other parts of the system where it is easier to discharge heat from the apparatus. Such an arrangement is of particular advantage where it is desired to air cool the unit since the absorber is usually of such a construction, and has such a location that it is difficult to force sufficient air to come in contact therewith to properly cool it. The present invention provides excellent means for transferring the heat of absorption from the absorber to the upper part of the unit since the use of resorber involves a cycle of circulation between the resorber and the evaporator anyway.

In accordance with the invention it is also possible to utilize the resorption solution as a means for generating gas supplied to the jet J, thus inducing circulating of the inert gas between the evaporator and absorber. By transferring heat from the warm absorption solution in the conduit 12 to the resorption solution in the auxiliary boiler 29 some of the heat supplied to the main boiler B is used to expel ammonia from the resorption solution for the purpose of supplying gas to the jet.

In the arrangement of Fig. 1 two operations are thus performed on the resorption solution in addition to those normally performed upon it in an ordinary resorber type of apparatus. It will readily be understood, however, that either of these operations might be performed without performing the other, and that the invention is not limited to the particular arrangement shown. If the apparatus does not employ a jet for circulating the inert gas the small auxiliary boiler 29 and its associated parts may, of course, be dispensed with and the pipe 26 joined directly to the conduit 36. It is also within the purview of the invention to cause the resorption solution to flow in series through the means for taking up heat from the absorber and the means for supplying ammonia from the boiler to the resorber circuit. An arrangement of this kind in which no jet is employed for circulating the inert gas is diagrammatically illustrated in Fig. 2. Because the apparatus of Fig. 2 is the same as that of Fig. 1, except for the features indicated, the complete system has not been shown, but only the resorber circuit and the associated parts.

In the arrangement of Fig. 2 the parts which correspond to those of Fig. 1 are similarly designated. The evaporator E and the absorber A may conform in all respects to those indicated in Fig. 1 and described above. Inert gas may be circulated between the evaporator and the absorber through the conduits 37 and 43, circulation being induced in this case by means of some sort of fan, as for example that indicated at 51 the fan being driven by some device as an electric motor M. The resorber circuit includes the pipe 24 for conveying resorption solutions from the vessel 23 of the resorber into the evaporator. The lower portion of the evaporator is connected by means of a conduit 52 directly to the coil 41 in the absorber which is in turn connected by a conduit 53 to the top of the coil 22 of the resorber. The conduit 21 which conveys refrigerant from the boiler system meets the conduit 53 above the absorber as indicated at the point 54. The coil 41 in the absorber and the gas lift pump portion of the conduit 53 are thus connected in series. The operation of the resorber system is similar to that of Fig. 1 the resorption solution flowing from the resorber R into the evaporator E through the conduit 24 then through the conduit 52 upwardly through the coil 41 where heat is taken up from the absorber and upwardly through the conduit 53 back to the resorber. Movement of the resorption solution is induced partially by the generation of refrigerant in the coil 41 and partially by the addition of refrigerant to the resorption solution at the point 44 in conduit 53. Thus the weight of the column of liquid in the right hand leg 52—53 of the resorber circuit is lessened sufficiently to permit gravity acting on the liquid in the left hand leg of the conduit 52 to move the resorption liquid into the coil 22 of the resorber.

The arrangement of Fig. 2 is such that it is not necessary for the gas entering the resorber circuit at the point 54 to create a very great lifting effect, since the resorption liquid has already been lightened by the application of heat to the coil 41. In fact, in some cases, the conduit 21 may be connected directly to the resorber leaving the coil 41 to perform the entire pumping action for the resorber circuit.

In both of the arrangements of Figs. 1 and 2 the unit may be air-cooled in which case suitable heat discharging fins may be added to the coil 22 and to various other parts of the unit to facilitate the discharge of heat therefrom. Various other changes and additions may be made to the apparatus without departing from the spirit of the invention or the scope of the annexed claims.

I claim:

1. In a continuous absorption refrigerating system, an evaporator, an absorber, a resorber, means for conveying resorption solution from the resorber to the evaporator, and means for conveying resorption solution from the evaporator to the resorber, said last mentioned means including an arrangement for bringing resorption liquid into heat transfer relation with the absorber whereby heat may be transferred from the absorber to the resorber.

2. In a continuous absorption refrigerating system, an evaporator, an absorber, a resorber, means for conveying resorption solution from the resorber to the evaporator, said last mentioned means including a conduit in heat transfer relation with the absorber, the conduit being so arranged and constructed as to act as a gas lift pump to cause movement of the resorption solution therein upon heat being supplied to the resorption solution from fluids in the absorber.

3. In a continuous absorption refrigerating system, an evaporator, a resorber, conduit means connecting the evaporator and the resorber to provide a path for the flow of resorption solution between the same and means for heating a part of said conduit means to promote circulation of the resorption solution over its path.

4. In a continuous absorption refrigerating system, an evaporator an absorber, a resorber, conduit means connecting the evaporator and the resorber to provide a path for the flow of resorption solution between the same and means for transferring heat from the absorber to a part of said conduit means to promote circulation of the resorption solution over its path.

5. In a continuous absorption refrigerating system, an evaporator, an absorber, a resorber, means for conveying resorption solution from the resorber to the evaporator, and means for conveying resorption solution from the evaporator to the resorber, said last mentioned means including a branched conduit one branch of which includes an arrangement for bringing resorption solution into heat transfer relation with the absorber.

6. In a continuous absorption refrigerating system, a boiler an evaporator, an absorber, a resorber, means for circulating absorption solution between the boiler and the absorber, means for conveying resorption solution from the resorber to the evaporator, means for conveying resorption solution from the evaporator to the resorber and including a conduit having two branches means for conveying refrigerant gas from the boiler to one of said branches and means for transferring heat from the absorber to the other of said branches.

7. In a continuous absorption refrigerating system, a boiler an evaporator, an absorber, a resorber, means for circulating absorption solution between the boiler and the absorber, means for conveying resorption solution from the resorber to the evaporator, means for conveying resorption solution from the evaporator to the resorber and including a conduit having two portions connected in series, means for conveying refrigerant gas from the boiler to one of said portions and means for transferring heat from the absorber to the other of said portions.

8. In a continuous absorption refrigerating system, an evaporator, an absorber, conduit means for conveying an inert gas from the evaporator to the absorber and from the absorber to the evaporator, a jet located in said conduit means, a resorber, means for conveying a resorption solution from the resorber to the evaporator and from the evaporator to the resorber means for heating a portion of said resorption solution conveying means to expel refrigerant gas therefrom and means for conveying the refrigerant gas so expelled to said jet to promote circulation of inert gas between the evaporator and the absorber.

9. In a continuous absorption refrigerating system, a boiler, an absorber, means for circulating absorption solution between the boiler and the absorber, an evaporator, conduit means for conveying an inert gas from the evaporator to the absorber and from the absorber to the evaporator, a jet located in said conduit means, a resorber, means for circulating a resorption solution between the resorber and the evaporator, means for transferring heat from a portion of said absorption solution circulating means to a portion of said resorption solution circulating means to expel refrigerant gas from the latter and means for conveying the refrigerant gas so expelled to said jet to promote circulation of inert gas between the evaporator and the absorber.

KURT V. NESSELMANN.